(12) United States Patent
Mehrmann (10) Patent No.: US 7,503,568 B2
(45) Date of Patent: Mar. 17, 2009

(54) SLED BOARD WITH TRACKING BOTTOM

(75) Inventor: Charles Mehrmann, Lynnwood, WA (US)

(73) Assignee: Wham-O, Inc., Emeryville, CA (US)

( * ) Notice: Subject to any disclaimer, the term of this patent is extended or adjusted under 35 U.S.C. 154(b) by 0 days.

(21) Appl. No.: 10/943,457

(22) Filed: Sep. 17, 2004

(65) Prior Publication Data

US 2005/0035564 A1 Feb. 17, 2005

Related U.S. Application Data

(63) Continuation of application No. 10/136,985, filed on May 2, 2002, now abandoned.

(51) Int. Cl.
*B62B 3/06* (2006.01)

(52) U.S. Cl. .................. 280/18; 280/21.1; 280/28.16

(58) Field of Classification Search .............. 280/28, 280/18, 19, 21.1, 845, 12.1
See application file for complete search history.

(56) References Cited

U.S. PATENT DOCUMENTS

| | | | |
|---|---|---|---|
| 3,199,887 A | | 8/1965 | McKelvey |
| 3,372,944 A | | 3/1968 | Lauritzen |
| 3,580,598 A | | 5/1971 | de Pauw |
| 3,643,979 A | | 2/1972 | Richards |
| 3,782,744 A | | 1/1974 | Milovich et al. |
| 3,782,745 A | * | 1/1974 | Stoveken ............... 280/18 |
| 3,884,490 A | | 5/1975 | Hellman |
| 3,937,482 A | | 2/1976 | Johnson |
| 3,952,354 A | | 4/1976 | Turner |
| 4,028,761 A | | 6/1977 | Taylor |
| 4,170,367 A | | 10/1979 | Rickenbacher |
| 4,206,933 A | | 6/1980 | Koch |
| D255,820 S | | 7/1980 | Borden et al. |
| 4,561,664 A | * | 12/1985 | Cashmere ............... 280/18 |
| 4,571,195 A | * | 2/1986 | Brooks, Jr. ............. 441/74 |
| 4,609,201 A | * | 9/1986 | Flachsmann ............ 280/20 |
| 4,666,171 A | | 5/1987 | Sellers |
| 4,678,445 A | | 7/1987 | Monreal |
| 4,850,913 A | | 7/1989 | Szabad, Jr. |
| 4,928,983 A | | 5/1990 | Maass |
| 4,971,350 A | | 11/1990 | Fagot |
| 5,018,760 A | * | 5/1991 | Remondet ............... 280/609 |
| 5,253,885 A | * | 10/1993 | McCracken et al. .......... 280/20 |
| 5,308,271 A | | 5/1994 | Foulke |
| 5,879,214 A | | 3/1999 | Bentley |
| 5,924,718 A | | 7/1999 | Gordon et al. |

(Continued)

*Primary Examiner*—Bridget Avery
(74) *Attorney, Agent, or Firm*—James A. Fox; Ginger R. Dreger; Goodwin Procter LLP (57) ABSTRACT

The invention features a soft foam sled board for use by a sitting or kneeling rider to slide over a snow or ice covered surface. The sled is prepared from a shaped polyethylene foam core, and at least the bottom surface of the core is covered by a slick, polyethylene film/polyethylene foam sheet laminate which provides little frictional resistance between the sled board and sliding surface, and provides an impervious outer surface to the board so as to resist puncture and water infiltrate. The sled board has one or more rails, ribs, or fins embedded below the body weight of the rider so as to either protrude from, or jut into, the board. The fins enhance the ability of the sled board to travel down the hill in a straight, forward direction.

22 Claims, 6 Drawing Sheets

U.S. PATENT DOCUMENTS

| | | |
|---|---|---|
| 6,139,031 A | 10/2000 | Wingard |
| 6,189,912 B1 | 2/2001 | Ritzinger |
| 6,290,249 B1 | 9/2001 | Wolf |
| 6,641,446 B1 * | 11/2003 | Bentley ........................ 441/82 |
| 7,083,173 B2 * | 8/2006 | Lehr et al. ............... 280/28.16 |

* cited by examiner

SLED BOARD WITH TRACKING BOTTOM

CROSS-REFERENCES TO RELATED APPLICATIONS

This application is a continuation of U.S. patent application Ser. No. 10/136,985, filed May 2, 2002 now abandoned which is incorporated herein by reference in its entirety for all purposes.

BACKGROUND OF THE INVENTION

The invention relates to a sports board for sliding on surfaces such as snow or ice.

Due to their comfort, light weight, and attractive designs, soft foam sled boards have become popular for sliding in a kneeling, prone, or sitting position on snow or ice. Soft foam sled boards have been prepared with a polyethylene foam core and a slick film outer skin that is puncture resistant and impervious to water. These boards have the advantage of a slick surface, which creates less drag and promotes quick release from the sliding surface, but also have a flat, planar bottom surface which is prone to lateral motion. Thus, sled boards of soft foam construction suffer from an inability to keep a straight course.

It is thus an object of the invention to provide a soft foam sled board that holds a substantially straight, forward course when used on a sliding surface such as snow or ice.

SUMMARY OF THE INVENTION

The invention generally features a soft foam sled board having a one or more tracking rails extending longitudinally below the portion of the sled that supports the body weight of the rider. A 'tracking rail' can be a rail, rib, or fin that protrudes from the under surface of the board; it can also be a channel or groove that juts into, or cuts into, the under surface of the board. The tracking rail enhances the ability of the sled to travel straight in a forward direction, while retaining the advantages of flex and cushioning, or shock absorption, that are attributes of the air pockets trapped within the soft foam core construction. The sliding device has one or more rails, preferably two or more rails.

Thus, the invention features a sliding device having a soft foam core, a slick skin covering at least the under surface of the device, and one or more tracking rails on the under surface and below the rider support region, of the sled body.

The rail is an integral part of the sled board and is attached or secured to the under surface. The rail is configured to be one with the sled board during manufacture and is attached or secured to the sled board, so that the rail cannot come apart or be separated from the remainder of the sled board. The rail is secured integrally to the sled board by any method or material that can secure the foam rail to a soft foam board, for example, an adhesive that permanently adheres to a soft foam polyethylene or to a polyethylene sheet or film. Preferably, the rail is secured integrally in the sled board by heat lamination.

The a sliding device of the invention is a sled board that tracks well in a straight, forward direction, especially when used in the downhill direction on a downward slope. The sled board of the invention has a soft foam construction and can be referred to as a "soft board." A sled board includes an elongate member having a self-supporting, soft foam core, and at least one longitudinally-extending rail. The elongate member includes an upwardly-curved leading end portion having a leading edge, and includes a body portion having a trailing edge, an upper surface, a rider support region, and a substantially planar under surface. The rail is integrally attached to the under surface, below the rider support region of the body portion of the elongate member.

The rail is aligned substantially parallel to the longitudinal axis of the sliding device. The rail can extend along a portion of the length of the bottom of the sled; for example, the rail(s) is one to two inches in length. Alternatively, the rail(s) can extend approximately a third, a half of the length of the sled, or over the full length of the sled. Preferably, the rail(s) extends along the back portion of the sled. More preferably, the rail(s) extends along the portion of the sled that is below the body weight of the user(s). There can be one longitudinal rail below the body weight of the rider, or two or more longitudinal rails.

The rail is beneath the slick bottom skin, or can be on top of the slick skin.

Preferably, the sliding device has an upturned 'nose' at the leading end portion. The upturned or "flipped-up" leading end has the advantage of preventing one end of the sled from acting as a brake by digging into the snow and stopping the sled.

In one embodiment, the sliding device has one or more hand grips or handles to which a rider may hold during use. Preferably, the sliding device has a pair of hand grips on opposite sides of the sled. More preferably, the handles are located adjacent to the location of the rider support region, or adjacent to and slightly forward of the rider support region. In another embodiment, where the sliding device has two or more pairs of handles so as to be held by two or more riders seated together on the sled, the handles are adjacent to, or adjacent and slightly forward of, the respective rider support regions, or of the combined rider(s) support region. Where the sliding device has one or more handles, the tracking rails are positioned so as not to be below the handgrips. In use, the rider pulls upward on the handgrips. Were the rails to be placed beneath the handles, the rails would be pulled upward by the upward force on the handgrip, thereby lifting the rails away from the sliding surface. This would decrease, or break, contact between the rail and the sliding surface, and reduce tracking efficiency.

The sled board of the invention can optionally further include a strap. The strap has two ends. One end of the strap can be attached to the sled board. Preferably, the strap is attached to the leading edge of the sled, such as to a hole or indentation formed in the leading end portion. Alternatively the strap can be attached to one or more hand grips of the sled. The second end of the strap can be used to pull the sled, for example to pull the sled up a hill between uses. The second end of the sled can be gripped by the user, or can be attached to the user, such as to the wrist of the user. Preferably, the strap has a loop at the second end that can fit around the wrist of the user. Alternatively, the second end of the strap can include a means for securing the strap to a garment of the user, such as a snap, button, or re-attachable adhesive, including without limitation, a VELCRO® (Velcro is a registered trademark of Velcro Industries B.V. of Curacao, Netherlands) adhesive.

By "sled board" is meant an apparatus for sliding on snow or ice, preferably on a downward slope. Such devices are commonly referred to as, for example, sleds or toboggans.

The longitudinal sides of the sled can be straight. Alternatively, the sides of the sled can be shaped so as to permit the sled to curve when the side of the sled is engaged into the snow. Preferably, the sides of the sled are shaped with one or more concave curves or with one or more convex curves. The curvature(s) on the two sides of the sleds can be symmetrical. Alternatively, the curvature(s) on the two sides of the sleds are asymmetrical. Optionally, the sides of the sled can be curved so as to give the sled a snowboard-like appearance.

In one embodiment, the sliding device can have a shape similar to a traditional freestyle snowboard, but in contrast to a snowboard which is made to be used in a standing position, the sliding device of the invention is intended for a kneeling, prone, or seated user. The sled of the invention does not require the stiffness or rigidity necessary for a standing rider.

DETAILED DESCRIPTION

FIGS. 1-7 generally depict a sliding device, or sled board, of the present invention. Sled board 1 typically includes elongate member 2, configured to slide on any sufficiently slippery surface, such as snow, ice, grass, metal, or water on a water slide. Preferably, the surface is covered with snow or ice, and has a downward slope.

Figure 1:
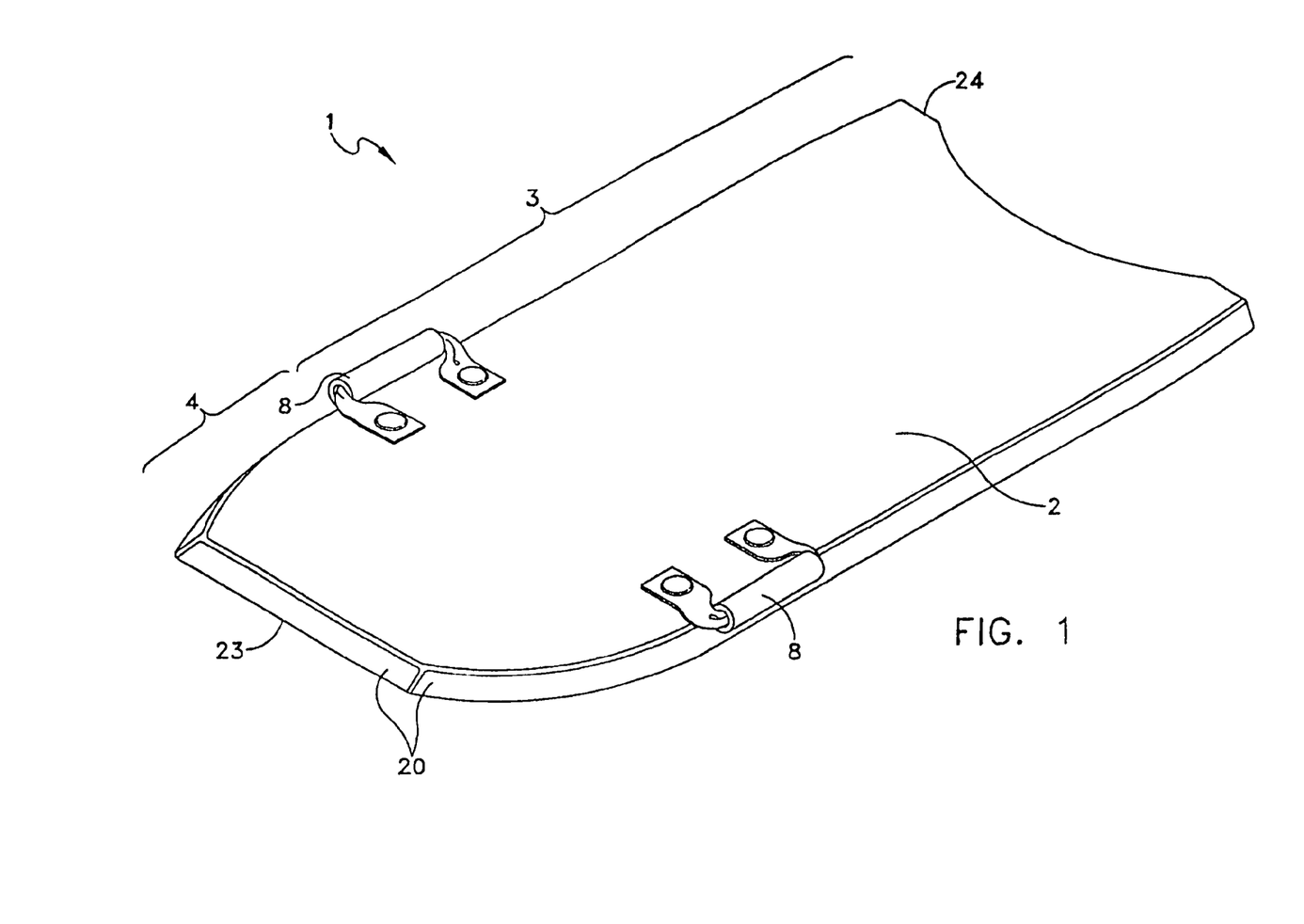
FIG. 1 is a perspective view from above a sled board of the invention.

As illustrated in FIG. 1, elongate member 2 includes a substantially flat, or planar, body portion 3, and a leading end portion 4. In use, a rider sits or kneels on rider support region. Rider support region is typically that area of body portion 3 on which a rider sits, kneels, or lies prone when sliding on sled board 1. Preferably, the area of rider support region is inward of one or more handgrip(s) 8, posterior to leading end portion 4, and anterior to trailing edge 24. Leading end portion 4 has an inward end that is positioned to connect to, or preferably to be continuous with, the forward end of body portion 3. Leading end portion 4 typically extends outward from body portion 3 with an upturned shape, so as to avoid digging into the sliding surface when sled board 1 moves forward.

Figure 2:
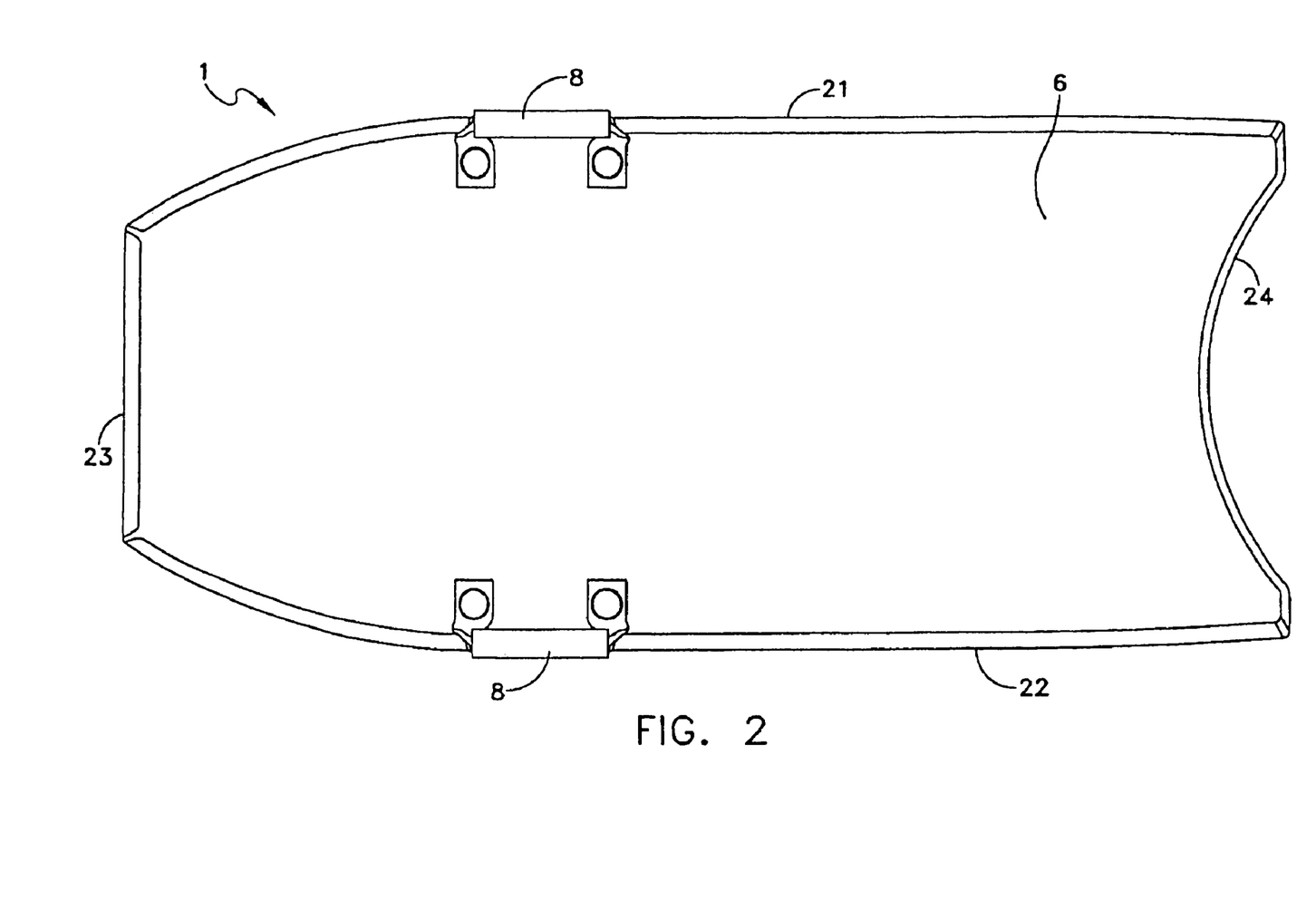
FIG. 2 is an illustration of the top side of a sled board of the invention.

FIG. 2 is a top view of a sled board of the invention. Elongate member 2 has an upper surface 6. Optionally, upper surface 6 has a top skin. FIG. 1 illustrates elongate member 2 with outer edge 20, which includes left and right side edges 21 and 22, and leading and trailing edges 23 and 24. Side edges 21 and 22 are substantially coplanar with body portion 3, while, due to the upturn in leading end portion 4, leading edge 23 is higher than the plane of body portion 3. Preferably, leading edge 23 is at least one inch higher than body portion 3, and can be, for example, 6 inches higher, or even 2 inches higher, or 5 or 10 inches higher.

Trailing edge 24 can be straight, can have a convex curve, or can have two or more convex curves, known in the art as bat tails.

Typically, the shape of leading and trailing ends 23 and 24 is rounded. Alternatively, the leading and trailing ends 23 and 24 may be straight, or polygonal, or any desired shape.

Typically, left and right sides 21 and 22 are straight. Alternatively, the sides of the sled may be shaped so as to permit the sled to curve when the side of the sled is engaged into the snow. Preferably, sides 21 and 22 are shaped with one or more concave curves. Alternatively, sides 21 and 22 have one or more convex curves or have a combination of concave curves and convex curves. The curvature(s) on the two sides of the sleds can be symmetrical. Alternatively, the curvature(s) on the two sides of the sleds are asymmetrical. Optionally, the sides of the sled may be curved so as to give the sled a snowboard-like appearance.

Elongate member 2 typically includes a bevel or outer edge 20. Alternatively, the outer edge can be rounded, or it will be appreciated that the outer edge 20 of elongate member 2 may not include any bevel at all.

One or more hand grip(s) or handles 8 can be affixed to the sled board 1 for a rider to grab onto during use. Preferably, the sled board 1 has a pair of handles 8 on opposite sides 21 and 22 of the sled board 1. More preferably, the handles 8 are located adjacent to the placement of the rider's position at the rider support region; or the handgrips 8 are located adjacent to and slightly forward of the rider support region. In another embodiment, the sliding device has two or more pairs of handles 8, so as to be held by two or more riders seated together on the sled, on the outer edges of the sled board 1 adjacent to a combined rider support region.

Figure 3:
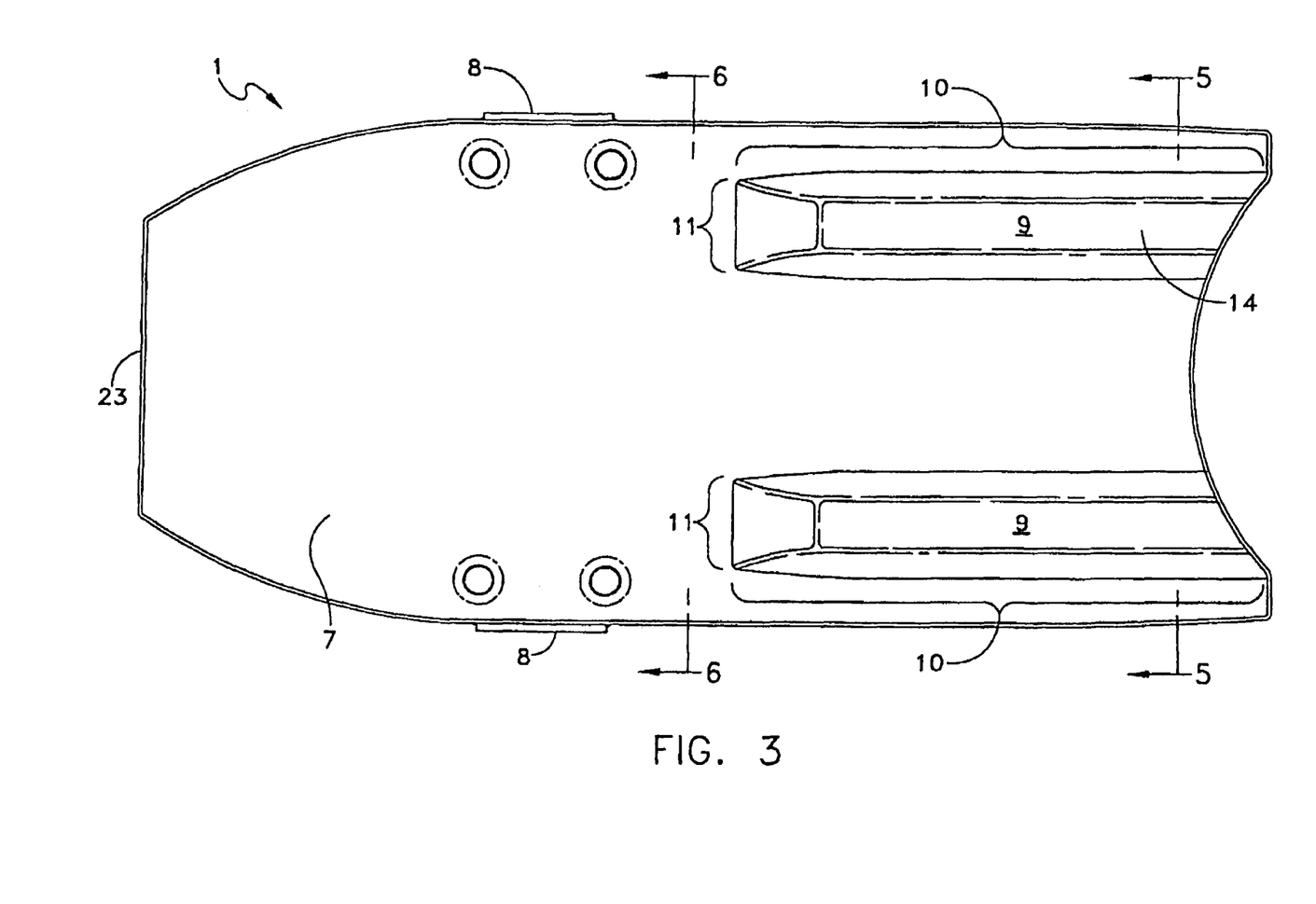
FIG. 3 is an illustration of the bottom side of an embodiment of the sled board of the invention that features two protruding rails with flat ridges.
Figure 7:
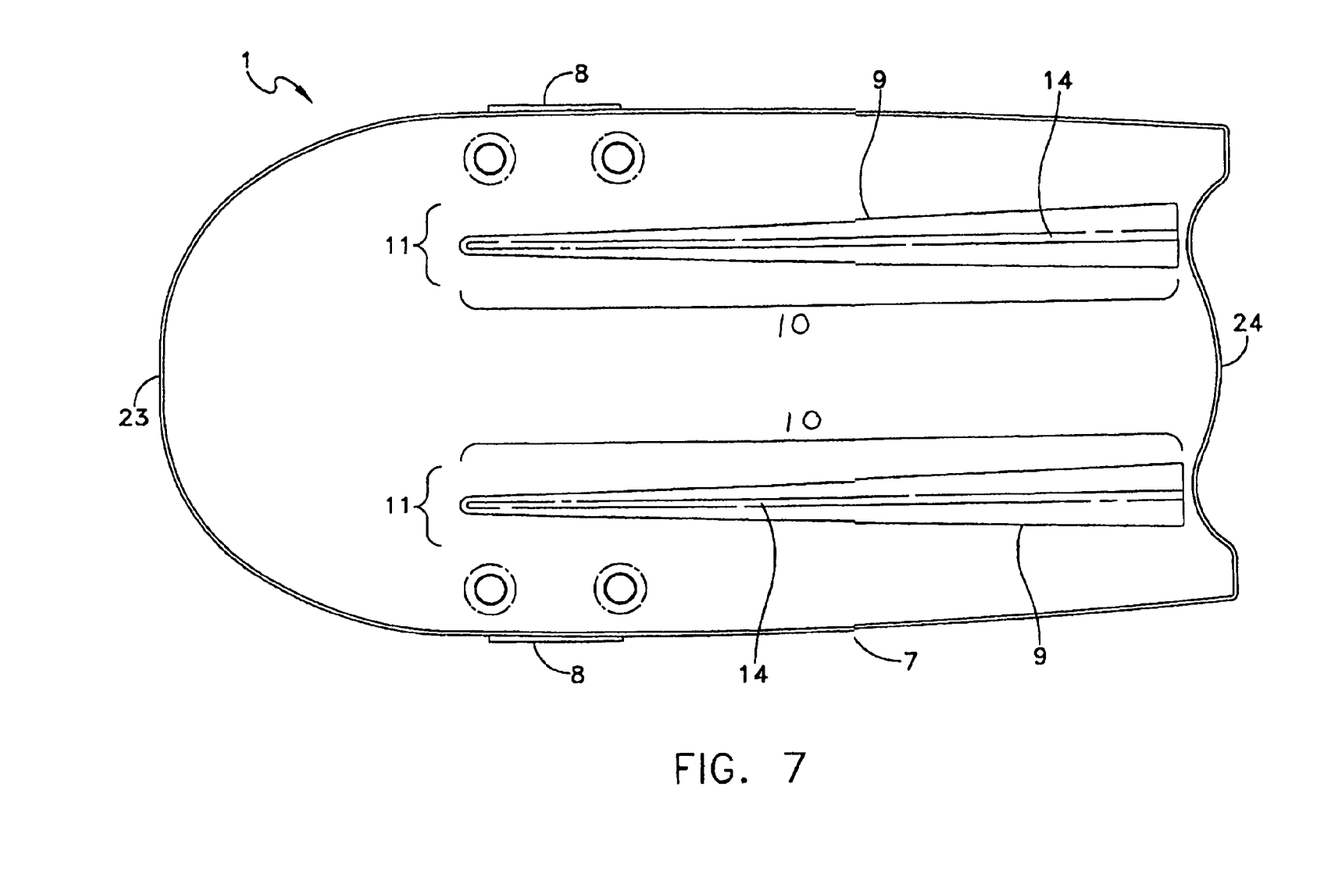
FIG. 7 is an illustration of the bottom side of an embodiment of a sled board of the invention that features two protruding triangular-peaked rails.

FIGS. 3 and 7 show the bottom side of two embodiments of the sled board 1 of the invention. Elongate member 2 has an under surface 7. Optionally, under surface 7 has a bottom skin. Under surface 7 includes leading under surface 7a, typically underlying leading upturned end portion 4. Under surface 7 further includes body under surface 7b, typically extending from the inward end of leading under surface 7a to trailing edge 24. The body under surface 7b is relatively planar to the surface over which the sled board 1 slides. Typically, the leading under surface 7a is shaped in a continuous curve originating at an inward end of the leading upturned end portion 4. Alternatively, the upturned bottom regions may be straight, polygonal, or curved in another shape.

The ability of sled board 1 to track in a forward direction is markedly improved by placing at least one rail 9 on the underside of the rider support region. Rail 9 is an integral feature of body under surface 7. In FIG. 3, rail 9 is a raised rail, protruding from the body under surface 7b. Alternatively, rail 9 can be a longitudinal groove or channel recessed in body under surface 7b. Where a bottom skin is present on under surface 7, rail 9 is preferably between the foam core of body portion 3 and the bottom skin. In an alternative embodiment, rail 9 is on top of the bottom skin.

A critical aspect of the invention is that, due to the high degree of flex of a soft foam board, the rail(s) must be positioned so that at least a portion of the rail 9 is located below the rider support region, which is the portion of the sled board 1 below the body weight of the rider. The placement of the rail 9 is less critical on supports prepared from materials having more rigidity, like wood, fiberglass, or hard plastic.

The shape of rail 9 is characterized by its shape, including, as appropriate, length 10, width 11, and depth or height 12. The shape of rail 9 can be triangular, can be rectangular, or can be a variant. In FIG. 2, rail 9 has a flat top and has sides that bevel with an inwardly directed slope. In FIG. 7, rail 9 can have a triangular shape, so as to have a triangular peaked top.

Rail 9 extends along under surface 7 of body portion 3 in a longitudinal direction. The length and exact location of the rail 9 can be varied, as long as the rail 9 is principally located below the rider support region, so that the body weight of the rider keeps rail 9 in slidable connection with the sliding surface. Rail 9 can extend longitudinally over all of body portion 3. Alternatively, rail 9 may extend longitudinally over only a portion of the rider support region of body portion 3. Thus, the forward end of rail 9 can be at the junction of leading end portion 4 and body portion 3, or the forward end of rail 9 can be in the area of hand grip 8, or can be posterior to handgrip 8. The rear end of rail 9 can be at trailing edge 24. Alternatively, the rear end of rail 9 can be positioned at the posterior side of the rider support region, or can be between the posterior side of the rider support region and trailing edge 24.

The width of the rail can vary along the length of the rail, for example, from 1/16 inch to 3 inches. Preferably, the rail has an angular shape varying from 20 to 90 degrees (20-90°) off the planar surface of the sled board.

Generally, tracking performance can be improved by increasing the depth of the rail, which is the distance between under surface 7 and the rail bottom surface 14. The rail can have a thickness ranging from, e.g., 0.125 to 2.0 inches, preferably 0.25 to 1.0 inches, and more preferably from 0.5 to 0.75 inches thick.

Where sled board 1 has two or more rails 9, the rails are generally parallel. The distance between the central point, or peak, of the rails is generally between, for example, 2 inches and 16 inches, preferably 10 inches. The rails should be arranged so as to distribute the body weight of the rider over the rails.

Figure 4:
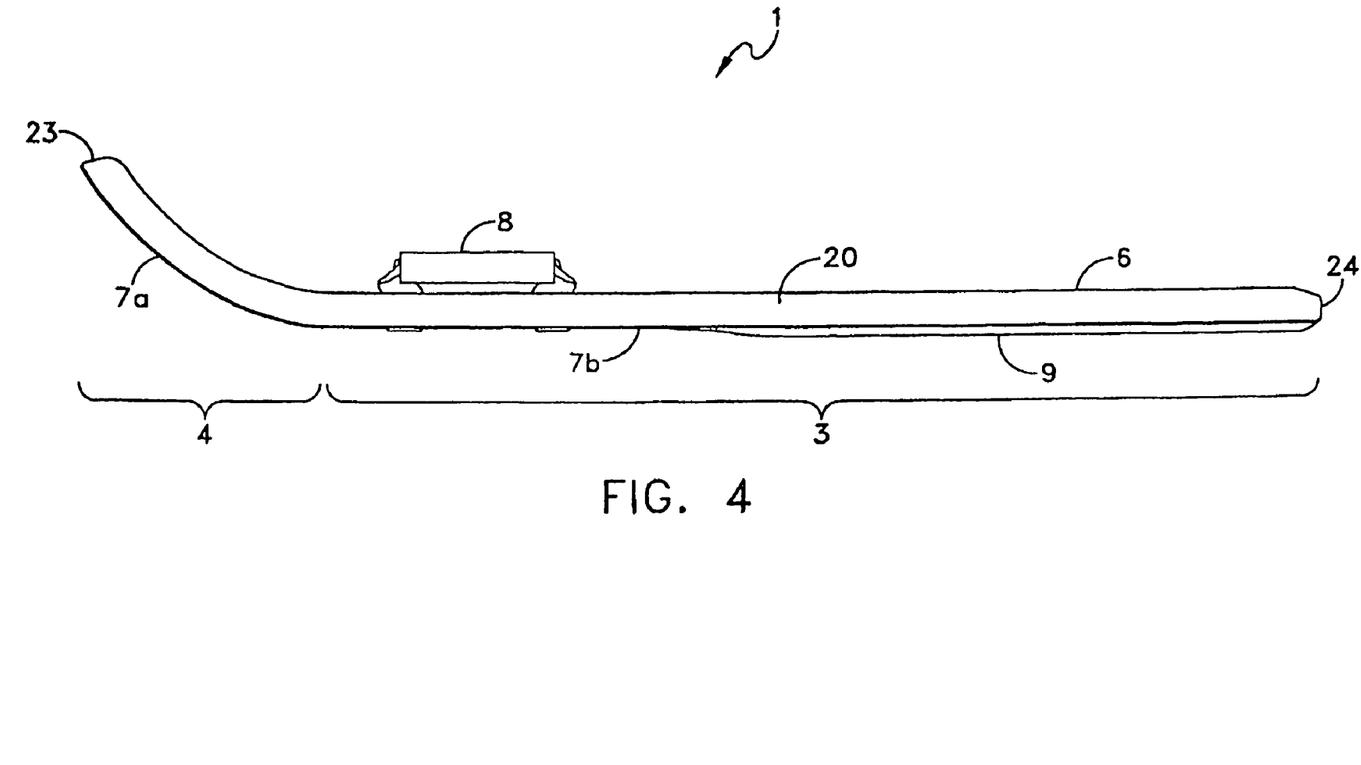
FIG. 4 is a side view of an embodiment of the sled board of the invention.

FIG. 4 is a side view of a sled board of the invention. Leading end portion 4 typically extends outward from body portion 3 with an upturned shape. Preferably, leading end portion 4 has a continuous, upwardly curved shape. The leading end portion 4 may have a polygonal shape, or may have another continuous curved shape, or may have a discontinuous curved shape. The leading end portion 4 can have a radius of curvature or, alternatively, may be kinked.

Figure 5:
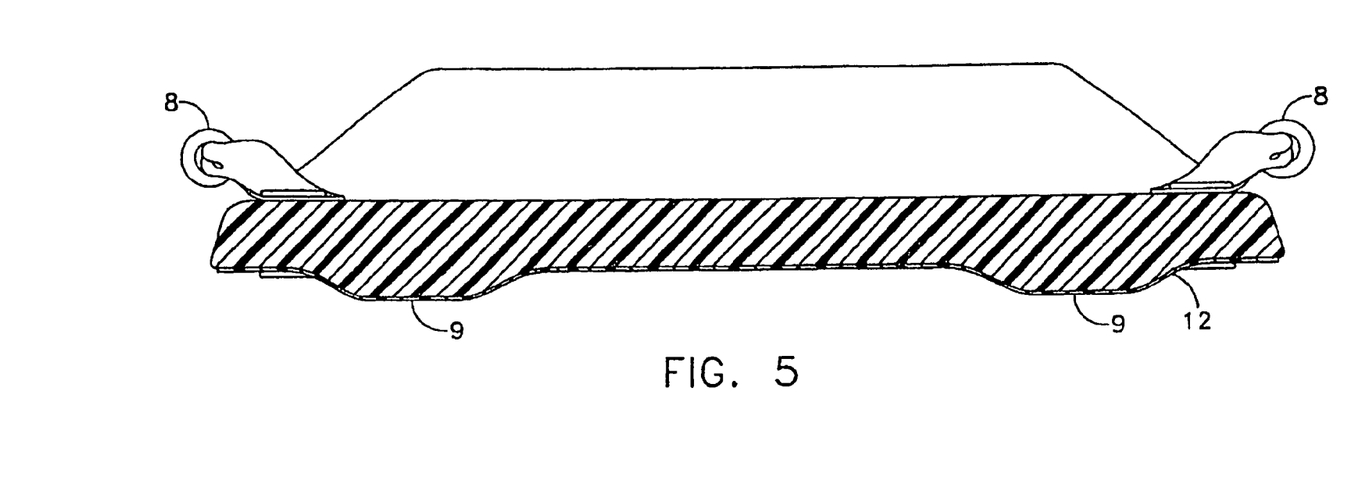
FIG. 5 is a cross-sectional view of the sled board of FIG. 3, shown at cross-section 5.

FIG. 5 is a cross-sectional view of the sled board 1 of FIG. 3, shown at cross-section 5.

Figure 6:
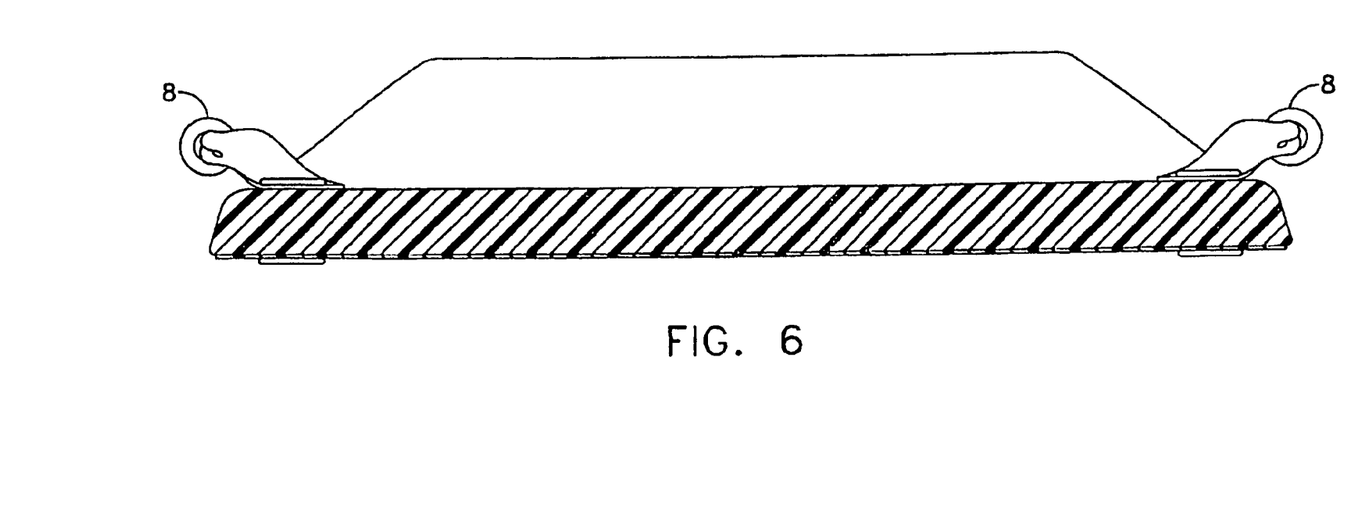
FIG. 6 is a cross-sectional view of the sled board of FIG. 3, shown at cross-section 6.

FIG. 6 is a cross-sectional view of the sled board 1 of FIG. 3, shown at cross-section 6.

The dimensions of sled board 1 can be adjusted to the size of the intended rider. Generally, a sled board 1 is approximately 36 to 82 inches in length, for example, 36 to 40 inches or 41 inches for a junior rider, or 42 to 50 inches, preferably 45 or 46 inches for an adult rider. Preferably, a sled board 1 designed for a single rider is approximately 36 to 46 inches in overall length, while a sled board 1 designed for two or more riders may be 50 to 85 inches long or longer, preferably 54 inches long, or 80 inches long.

Generally, a sled board 1 is approximately 20 to 25 inches in overall width, preferably 21 or 24 inches in width. The sled board 1 can have a foam core depth of approximately 1/2 to 2 inches and preferably has a depth of 1 inch.

Method of Manufacture

In manufacture, the sled board of the invention is prepared substantially as follows. The elongate member is typically made of a higher density closed-cell material than the core material of the sled board, including but not limited to polyethylene, polypropylene, R-cell, or polystyrene. Optionally, the sled board can be made substantially as described in U.S. Pat. No. 4,850,913, issued Jul. 25, 1989, hereby incorporated by reference. For example, in one embodiment of the invention, elongate member 2 has a shaped core of closed-cell polyethylene foam, to which a skin is heat laminated. The skin is prepared from a polyethylene film laminated directly to the under surface of the foam core. Alternatively, the skin is pre-formed from a denser closed-cell polyethylene foam laminated to a polyethylene film. The film/foam skin is made by heat lamination, and is adhered to the lower surface of the foam core and, optionally, to the outer edges of the sled board.

The foam core is a shaped core of closed-cell polyethylene foam planking, preferably with a density of about 1 to 10 pounds per cubic foot (pcf), more preferably with a density of about 2 to 4 pcf. The core can either be made from a single piece of foam planking cut to shape, or it can be composed of a laminate of a plurality of foam sheets either heat laminated to each other, or laminated by other methods known in the art, such as polyethylene film lamination. A laminated core is cut to shape similarly to a one-piece core.

The rail is prepared by cutting a piece of polyethylene foam into a desired rail shape. The rail piece can be a triangular shape, so as to create a rail having a peaked bottom rail surface. The rail piece can have a substantially rectangular shape, so as to create a flat bottom rail surface. The rail piece can have flat rectangular shape to create a flat bottom rail surface, but with sloped sides, thereby merging the advantages of the triangular and rectangular designs. Preferably, the foam used for the rail is denser foam than the foam used for the core of the sled.

The foam rail piece is heat laminated into position on the under side of the foam core. The foam rail piece(s) is positioned on the under surface of the foam core by lamination. The laminator consists of two rollers that are positioned vertically with a variable gap between them and have a method of applying pressure against each other, like springs or weights. Either roller is driven or in some cases both rollers are driven.

Positioned in the middle of the rollers, but located about 6 back from the "pinch zone," is a heat source. The heat source can be hot air (600 degrees) or a radiant heat source like infrared. The materials to be laminated are passed above and below the heat source, and then through the pinch rollers which drive the material through at a constant rate of speed. The pinch rollers apply pressure to the melted surfaces of the foam materials, and they consequently stick together.

A piece of bottom slick skin is adhered to the under side of the foam core/foam rail unit: At the same time that the slick skin is passing through the laminator, a piece of #2 MICROCELL® (Microcell is a registered trademark of Sentinel Products Corp. of Hyannis, Mass.) foam is fed through the laminator on top of the slick skin. The MICROCELL® foam should be at least as thick as the height of the rail; it acts as a buffer to absorb the rail, while maintaining surrounding pressure around the rail, so that the slick skin will bond to the rail-raised under surface of the sled board body.

The sled board of the invention has a slippery, i.e., slick, outer skin over substantially all of the bottom of under surface 7 and, optionally, over part or all of outer edge 20. The slick bottom surface on the underside and outer edge of the sled board creates less drag and promotes quick release from the sliding surface. The slick skin gives the sled board improved performance, superior cosmetic appearance, ability to receive permanent color impregnation of a logo, ability to receive dry adhesive traction material, decreased water absorption by the board, and other benefits. Preferably, the bottom skin is a thin sheet of polyethylene or similar plastic, such as, for example, SURLYN® (Surlyn is a registered trademark of E.I. DuPont De Nememours and Company of Willmington, Del.). A sheet of skin, e.g., 10-25 mil, can be extruded onto a 1/8 inch sheet of foam (commonly 4#-8# polyethylene). A material suitable for use as a bottom skin is, without limitation, SLICK-SKINT™ (Slickskin is a trademark of Earth & Ocean Sports, Inc. of Redmond, Wash.). Alternatively, the 10 to 25 mil film can be extruded directly onto the core material without first extruding it to the 4#-8# foam backing. The polyethylene film forming the outer skin of the sled board is suitably about 1 to 100 mils in thickness, preferably about 10 to 50 mils in thickness.

This film can be extruded onto a polyethylene closed-cell foam sheet having a density of about 1 to 10 pcf, preferably about 4 to 8 pcf, and most preferably about 6 pcf. The film may be clear or may be colored during-its manufacture. The film is extruded to the foam sheet at about 400° F., as known in the art, and the film/foam laminate is air cooled and taken up on rolls.

The bottom skin (the 1/8-inch foam sheet and skin combination) is then laminated onto a core, typically a rectangular core, composed of lower density material, including but not limited to polyethylene, polypropylene, R-cell, or polystyrene. The foam core and the film/foam laminate are then each heated to about 400° F. on the foam surfaces to be laminated together. The closed-cells on these surfaces open under the influence of heat, and the surfaces are brought together under compression. The heat and pressure enable a laminate to be formed. The core is then reversed, and the unlaminated side is heated and another sheet of film/foam laminate is similarly laminated thereto. A film/foam sheet is subsequently laminated to the exposed side edges of the board, thus substantially encasing the core in film/foam laminate, or the top sheet is left large enough to wrap the sides. The edge strips or top sheet wrap are also applied by heat lamination and compression. The pressure may be applied by hand, iron, or roller, or by another method known in the art. The board is air-cooled.

Conversely, this skin could be extruded directly onto the core material, without first extruding onto the 1/8-inch carrier sheet of foam. Once the core and the skin are bonded, the plan shape, as shown in the sled from the top view, is fashioned, and the core is contoured to create, for example, rounded sides, or a dished middle, or shaped in such a way as to create a pocket to hold the rider. This inherently flat core and skin is then laminated or bonded to the top deck. The top deck can be of polyethylene, but can also be of nylon, polyester, polypropylene, MICROCELL®, or elastomeric metallocene rubber (EMR). As the board emerges from the rollers in a hot, malleable state, the nose is curved into an upturned shape and allowed to cool. The perimeter is then finished off by heat lamination and is then trimmed to create a finished sled. Heat stamps are then applied, and handles 8 are affixed by methods known to those skilled in the art, so as to complete the product. Optionally, handles are applied as disclosed in U.S. Pat. No. 5,154,655, issued Oct. 13, 1992, hereby incorporated by reference.

Optionally, the upper surface of the sled board comes in sheet form, 1/8 to 3/16 inch thick. It can be #4 polyethylene foam. The sheet is laminated onto the core, and the sides are heat laminated by hand around the sides. Any embossing is then put into the skin. Another alternative method is to pre-emboss or vacuum-form the sheet and then laminate it to the core. Color patterns may optionally be incorporated into the film/foam laminate by adding color concentrate in a pattern configuration to the film surface immediately prior to lamination to the foam sheet. This provides a similar pattern configuration on the board. For example, the color may be applied between the film and foam during the lamination process when the film and foam sheets have both been unwound from rolls and exposed to heat and are traveling toward the nip of pressure rolls. As the heated sheets pass through the nip of the pressure rolls, heat lamination takes place.

A logo may be permanently applied to the deck and/or bottom of the board. In a non-limiting example, a logo may be permanently applied to the polyethylene film outer layer, using heat and pressure on a MYLAR® (MYLAR is a registered trademark of E.I. DuPont De Nemours and Company of Wilmington, Del.) transfer pattern made especially for applying to polyethylene (Mylar is a polyester film made by E.I. DuPont & Company, Ltd.).

A foam board of the invention is slick to the touch and particularly when it is wet, the board is slippery to feel. In order to provide good frictional adhesion, dry adhesive traction material or wax may be applied. The dry adhesive traction material is particularly suitable for applying to the top deck of the board, either substantially over the whole surface of the deck or in particular areas, as appropriate. Dry adhesive or wax may also be applied around the edges of the board to facilitate handling. Traction material on the upper surface of the board facilitates a good grip by the user without impairing the functional advantages of the slick bottom surfaces of the board. Suitable dry adhesives are, e.g., TRAC-TOP® (Trac-Top is a registered trademark of Earth & Ocean Sports, Inc. of Redmond, Wash.). Preferably, the adhesive is a pressure-sensitive adhesive.

The materials and design of the board combine synergistically to provide a slick board with excellent performance characteristics, since frictional resistance is decreased and loss in velocity as the board moves through the medium is minimized by use of the glossy, non-absorptive surface. The slick polyethylene film skin is resistant to puncturing and impervious to water.

Appropriate materials for the core also include polyethylene foam, polypropylene foam, polyurethane foam, and ARCEL® foam (Arcel is a registered trademark of the Atlantic Richfield Company of Philadelphia, Pa.). Polyethylene foam is the preferred material. The outer film sheet is preferably polyethylene film laminated to a sheet of polyethylene foam. The polyethylene foam sheet provides strength and cushioning to the film, and the slick skin formed from the film is laminated to the core of the board to provide a board having a smooth, glossy surface which glides easily through snow, or over other surfaces.

The performance characteristics of the board may be varied by varying the density of the foam core, foam sheet and/or film. For example, a sliding device can have a 30-mil thickness of polyethylene film forming the skin on the deck of the board and on the bottom of the board, and a 15-mil thickness of film as the outer glossy surface on the edges of the board. A stiffer board is provided if either the foam core has a greater density and/or the film skins have a greater density and/or thickness. The degree of flex of the board can be controlled by varying the thickness of the foam core and skin, a greater degree of flex being provided by use of less dense foams and thinner films. In particular, thickness of the film outer skin is determinative of flexibility of the board.

In balancing the properties required, the strength of the product must also be considered, and in general, heavier, thicker materials provide the advantage of greater strength, but the disadvantage of greater weight and stiffness.

While the invention has been described above with respect to certain embodiments thereof, it will be appreciated that variations and modifications may be made without departing from the spirit and scope of the invention.

I claim:

1. A sled comprising:
   (a) an elongate member having a self-supporting, soft foam core, said elongate member comprising an upwardly-curved leading end portion having a leading edge, and a body portion having a trailing edge, a substantially planar upper surface, a rider support region, a substantially planar under surface;

(b) at least one longitudinal rail integrally attached to said under surface and positioned below the rider support region of the body portion, wherein the at least one longitudinal rail includes an elongate, substantially planar surface and a leading end portion having an inclined surface, wherein the elongate, substantially planar surface extends along a substantial portion of the at least one longitudinal rail and is at least substantially parallel to the under surface;

(c) wherein said body portion further comprises one or more handles adjacent said rider support region and attached to the upper surface of the elongate member by straps, wherein the handles are substantially parallel to the upper surface; and (d) wherein said elongate member has a bottom skin covering at least a portion of said under surface and at least a portion of said longitudinal rail, said bottom skin comprising a slick skin layer and a foam layer.

2. The sled of claim 1, where the sled comprises at least two longitudinal rails below said rider support region of said body portion.

3. The sled of claim 1, wherein the elongate member comprises an outer side edge, said outer side edge comprising a region of concave curvature.

4. The sled of claim 1, wherein said elongate member comprises an outer side edge, said outer side edge comprising a convex curve.

5. The sled of claim 1, wherein said elongate member comprises symmetrical side edges.

6. The sled of claim 1, wherein said elongate member comprises two outer side edges having asymmetrical curvature.

7. The sled of claim 1, wherein said elongate member comprises an outer side edge has a bevel.

8. The sled of claim 1, further comprising a top skin on said upper surface.

9. The sled of claim 1, wherein the soft foam core extends from the trailing edge of the body portion to the leading edge of the upturned leading end portion.

10. The sled of claim 1, further comprising a bottom skin on said under surface.

11. The sled of claim 1, wherein said rail is at least two inches in length.

12. The sled of claim 1, wherein said body portion has a length, and said rail has a length substantially equal to the length of said body portion.

13. The sled of claim 1, wherein said rail has a depth of 0.1 inches to 2.0 inches.

14. The sled of claim 1, wherein said rail is a protruding ridge.

15. The sled of claim 1, wherein said rail is an intruding groove.

16. The sled of claim 1, wherein said rail comprises a soft foam core.

17. The sled of claim 9, wherein said rail is under said bottom skin.

18. The sled of claim 9, wherein said rail is above said bottom skin.

19. The sled of claim 16, wherein the soft foam core of said rail has a density that is equal to or greater than the soft foam core of said elongate member.

20. A sled comprising an upwardly curved leading portion, an elongate portion, and a self-supporting soft foam core, the elongate portion comprising:

(a) a support section for support of a rider;

(b) a substantially planar upper surface comprising a top skin;

(c) an under surface comprising a bottom skin; and (d) at least one longitudinally-extending rail integrally secured to the under surface of the support section of the elongate portion; wherein said bottom skin covers at least a portion of said longitudinally-extending rail, said bottom skin comprising a slick skin layer and a foam layer;

wherein the at least one longitudinal rail includes an elongate, substantially planar surface and a leading end portion having an inclined surface, wherein the elongate, substantially planar surface extends along a substantial portion of the at least one longitudinally-extending rail and is at least substantially parallel to the under surface, and wherein at least one handle adjacent said support section and attached to the upper surface of the elongate portion by straps and wherein the handles are substantially parallel to the upper surface.

21. The sled of claim 20, wherein said bottom skin is a polyethylene film.

22. A self-supporting, soft foam board for sliding over a surface, comprising:

(a) a substantially planar upper surface;

(b) a bottom surface;

(c) one or more handles coupled with the upper surface and support region for a rider; and (d) at least one convolution integral to the bottom of said board below the rider support region; wherein the at least one convolution includes an elongate, substantially planar surface and a leading end portion having an inclined surface, wherein the elongate, substantially planar surface extends along a substantial portion of the at least one convolution and is at least substantially parallel to the under surface wherein said bottom surface comprises a bottom skin that covers at least a portion of said convolution, said bottom skin comprising a slick skin layer and a foam layer; whereby the bottom skin covering said convolution is in contact with the surface when a rider on said rider support region pulls on said one or more handles.

* * * * *